(12) United States Patent
Stroud

(10) Patent No.: US 6,396,880 B1
(45) Date of Patent: May 28, 2002

(54) π/4 DQPSK ENCODER AND MODULATOR

(76) Inventor: Ernest T. Stroud, 3407 Quaker Run Dr., Greensboro, NC (US) 27410

( * ) Notice: Subject to any disclaimer, the term of this patent is extended or adjusted under 35 U.S.C. 154(b) by 0 days.

(21) Appl. No.: 09/062,214

(22) Filed: Apr. 17, 1998

(51) Int. Cl.[7] .............................................. H04L 27/20
(52) U.S. Cl. ........................ 375/308; 332/103; 708/307
(58) Field of Search ................................. 375/308, 295, 375/259, 260, 279, 280, 281, 283, 296; 332/103

(56) References Cited

U.S. PATENT DOCUMENTS

| | | | |
|---|---|---|---|
| 5,140,613 A | * 8/1992 | Birgenheier et al. | ........ 375/308 |
| 5,222,103 A | * 6/1993 | Gross | ........................... 375/281 |
| 5,260,673 A | * 11/1993 | Pham | |
| 5,379,322 A | * 1/1995 | Kosaka et al. | ............... 375/296 |
| 5,379,323 A | 1/1995 | Nakaya | ........................ 375/331 |
| 5,438,592 A | 8/1995 | Boccuzzi | ..................... 375/283 |
| 5,526,381 A | 6/1996 | Boccuzzi | ..................... 375/331 |
| 5,528,631 A | 6/1996 | Hayashi et al. | .............. 375/283 |
| 5,546,428 A | 8/1996 | Nam et al. | ................... 375/308 |
| 5,604,770 A | 2/1997 | Fetz | ............................ 375/296 |
| 5,822,363 A | * 10/1998 | Le Roy | ........................ 375/143 |

OTHER PUBLICATIONS

Kobayashi et al., IEEE Custom Integrated Circuits Conference, "An Integrated π/4–Shift QPSK Baseband Modulator", 1994.

Andrew D. Booth, *A Signed Binary Muliplication Technique*, Oxford University Press, 1951.

Henry Samueli, *The Design of Muliplierless Digital Data Transmission Filters with Powers–of–tow–Coefficients*, 1990.

Les Freed, Net Tools, PC Magazine, Feb. 10, 1998.

* cited by examiner

*Primary Examiner*—Jean Corrielus
(74) *Attorney, Agent, or Firm*—Samuels, Gauthier & Stevens LLP

(57) ABSTRACT

A π/4 DQPSK modulator includes a rotated and offset π/4 encoder that provides encoded I, Q constellation indices values using positive integers. The positive integer I and Q values are input to a digital filter that provides filtered I, Q constellation indices values. These filtered values are then rotated and offset back to conventional π/4 DQPSK constellation values, modulated and transmitted. Since the rotated and offset π/4 encoder provides I, Q constellation indices as positive integers, the filters are implemented as multiplierless digital filters which significantly reduces the complexity of the filters. Specifically, the multiplierless digital filters can be implemented using shift registers and summers. In a preferred embodiment the filters are programmable. In addition, using positive integers to represent the rotated and offset π/4 signalling constellation indices allows the indices to be represented as a binary value with less bits in contrast to prior art systems. Significantly, representing the indices with less bits further reduces the complexity of the digital filters.

14 Claims, 6 Drawing Sheets

ENCODER MAPPING

| I(k-1) | Q(k-1) | X(k) | Y(k) | I(k) | Q(K) |
|---|---|---|---|---|---|
| 17 | 24 | 0 | 0 | 7 | 24 |
| 17 | 24 | 0 | 1 | 0 | 7 |
| 17 | 24 | 1 | 0 | 24 | 17 |
| 17 | 24 | 1 | 1 | 17 | 0 |
| 24 | 17 | 0 | 0 | 17 | 24 |
| 24 | 17 | 0 | 1 | 0 | 17 |
| 24 | 17 | 1 | 0 | 24 | 7 |
| 24 | 17 | 1 | 1 | 7 | 0 |
| 24 | 7 | 0 | 0 | 24 | 17 |
| 24 | 7 | 0 | 1 | 7 | 24 |
| 24 | 7 | 1 | 0 | 17 | 0 |
| 24 | 7 | 1 | 1 | 7 | 24 |
| 17 | 0 | 0 | 0 | 24 | 7 |
| 17 | 0 | 0 | 1 | 17 | 24 |
| 17 | 0 | 1 | 0 | 7 | 0 |
| 17 | 0 | 1 | 1 | 0 | 17 |
| 7 | 0 | 0 | 0 | 17 | 0 |
| 7 | 0 | 0 | 1 | 24 | 17 |
| 7 | 0 | 1 | 0 | 0 | 7 |
| 7 | 0 | 1 | 1 | 7 | 24 |
| 0 | 7 | 0 | 0 | 7 | 0 |
| 0 | 7 | 0 | 1 | 24 | 7 |
| 0 | 7 | 1 | 0 | 0 | 17 |
| 0 | 7 | 1 | 1 | 17 | 24 |
| 0 | 17 | 0 | 0 | 0 | 7 |
| 0 | 17 | 0 | 1 | 17 | 0 |
| 0 | 17 | 1 | 0 | 7 | 24 |
| 0 | 17 | 1 | 1 | 24 | 17 |
| 7 | 24 | 0 | 0 | 0 | 17 |
| 7 | 24 | 0 | 1 | 7 | 0 |
| 7 | 24 | 1 | 0 | 17 | 24 |
| 7 | 24 | 1 | 1 | 24 | 7 |

Fig. 6

π/4 DQPSK ENCODER AND MODULATOR

BACKGROUND OF THE INVENTION

The invention relates to the field of digital communications, and in particular to a π/4 differential quadrature phase shift keying (DQPSK) encoder that employs a rotated and offset signalling constellation, and to a reduced complexity π/4 DQPSK modulator.

Due to the widespread popularity of the World Wide Web, Internet traffic is at an all time high and rapidly increasing. The resulting congestion is taking its toll on users and telephone companies alike. Users are often frustrated by the length of time it takes to download complex graphics and videos. For example, a ten megabyte video clip which is the equivalent of a four minute movie, takes approximately ninety-three minutes using a 14.4 kilobyte modem and forty-six minutes using a 28.8 kilobyte modem. In addition, lengthy data transmissions are tying up telephone company switches that were designed to handle brief telephone calls.

As an alternative to data communications over telephone lines, cable modems have emerged as a technology which dramatically increases the amount of data that can be transferred over the Internet. Cable modems are used primarily for home Internet access since they use the existing cable television wiring, and most homes are wired for cable (in contrast to businesses).

There are two primary classes of cable modems. The first are two-way devices which allow a user to both upload and download information over the coax cable. The two-way devices are also referred to as hybrid fiber-coax (HFC) modems. The second class of cable modems are one-way devices which only allow a user to download information over the cable. A user must employ a conventional telephone dial-up connection to issue commands.

FIG. 1 illustrates a functional block diagram of a system 10 which employs HFC modems. The system 10 includes a plurality of user sites 12, 14 which each include a cable modem 16, 18 and a computer 20, 22, respectively. The user site 12 may also connect a TV 24 to the cable modem 16 to receive TV signals. The modems 16, 18 communicate with a neighborhood concentrator 26 over conventional coax cable lines 28, 30. To complete the connection to the Internet, the neighborhood concentrator 26 communicates over a fiber-optic network 32 with a cable provider's main facility 34, which establishes the high speed connection to the Internet. A number of signal encoding techniques are used to transmit the data over the cable lines. These techniques include BPSK, QPSK, π/4 DQPSK and QAM.

A problem with existing π/4 DQPSK modulators is the size of the integrated circuit which contains the modulator and the power drawn by the circuit. One source of the problem is the internal bus width required to accurately represent the eight(8) constellation points used for π/4 DQPSK signalling. FIG. 2 illustrates a plot of a signalling constellation 40 for a conventional π/4 DQPSK modulator. The constellation includes eight constellation points 42–49, and each point is uniquely defined in two-dimensions (I, Q).

One of the numbers which must be represented in the constellation 40 is the value 1/SRQT(2). To represent this value using a binary number, at least ten bits are generally required to ensure the quantization error is relatively insignificant. Therefore, following the encoding step, the subsequent processing steps of the π/4 DQPSK modulator such as digital filtering, and the multiplications and additions associated therewith must be configured to work with at least ten bits. This quickly leads to a large number of registers, flip-flops and other sequential and combinational logic devices within the circuit which necessitates an increase in the chip size and the amount of power used by the circuit.

This problem is not limited to π/4 DQPSK modulators used for HFC modems. π/4 DQPSK modulators are used in a wide variety of communication applications including wireless cellular, including system employing the IS-54 standard, and each of these applications is subject to the need for a large number of sequential and combination logic devices. This is particularly troublesome in applications such as handheld transceivers where it is desirable to reduce the modulator size and power consumption.

Therefore, there is a need for a reduced complexity π/4 DQPSK modulator.

SUMMARY OF THE INVENTION

An object of the present invention is to provide a π/4 DQPSK modulator of reduced complexity.

A further object is to provide a π/4 DQPSK encoder.

Briefly, according to the present invention, a π/4 DQPSK modulator includes a rotated and offset π/4 encoder that provides encoded I, Q constellation indices values using positive integers. The positive integer I and Q values are input to a digital filter that provides filtered I, Q constellation indices values. These filtered values are then rotated and offset back to conventional π/4 DQPSK constellation values, modulated and transmitted.

Since the rotated and offset π/4 encoder provides I, Q constellation indices as positive integers, the filters are implemented as multiplierless digital filters which significantly reduces the complexity of the filters. Specifically, the multiplierless digital filters can be implemented using shift registers and summers. In a preferred embodiment the filters are programmable. In addition, using positive integers to represent the rotated and offset π/4 signalling constellation indices allows the indices to be represented as a binary value with less bits in contrast to prior art systems. Significantly, representing the indices with less bits further reduces the complexity of the digital filters.

Advantageously, encoding the π/4 DQPSK signalling constellation indices with positive integers reduces the number to bits required to represent the indices, and allows the use of multiplierless digital filters, which together reduce the size of the integrated circuit for the modulator and the power drawn by the circuit.

These and other objects, features and advantages of the present invention will become apparent in light of the following detailed description of preferred embodiments thereof, as illustrated in the accompanying drawings.

BRIEF DESCRIPTION OF THE DRAWINGS

FIG. 6 illustrates the encoder mapping.

DETAILED DESCRIPTION OF THE INVENTION

Figure 3:
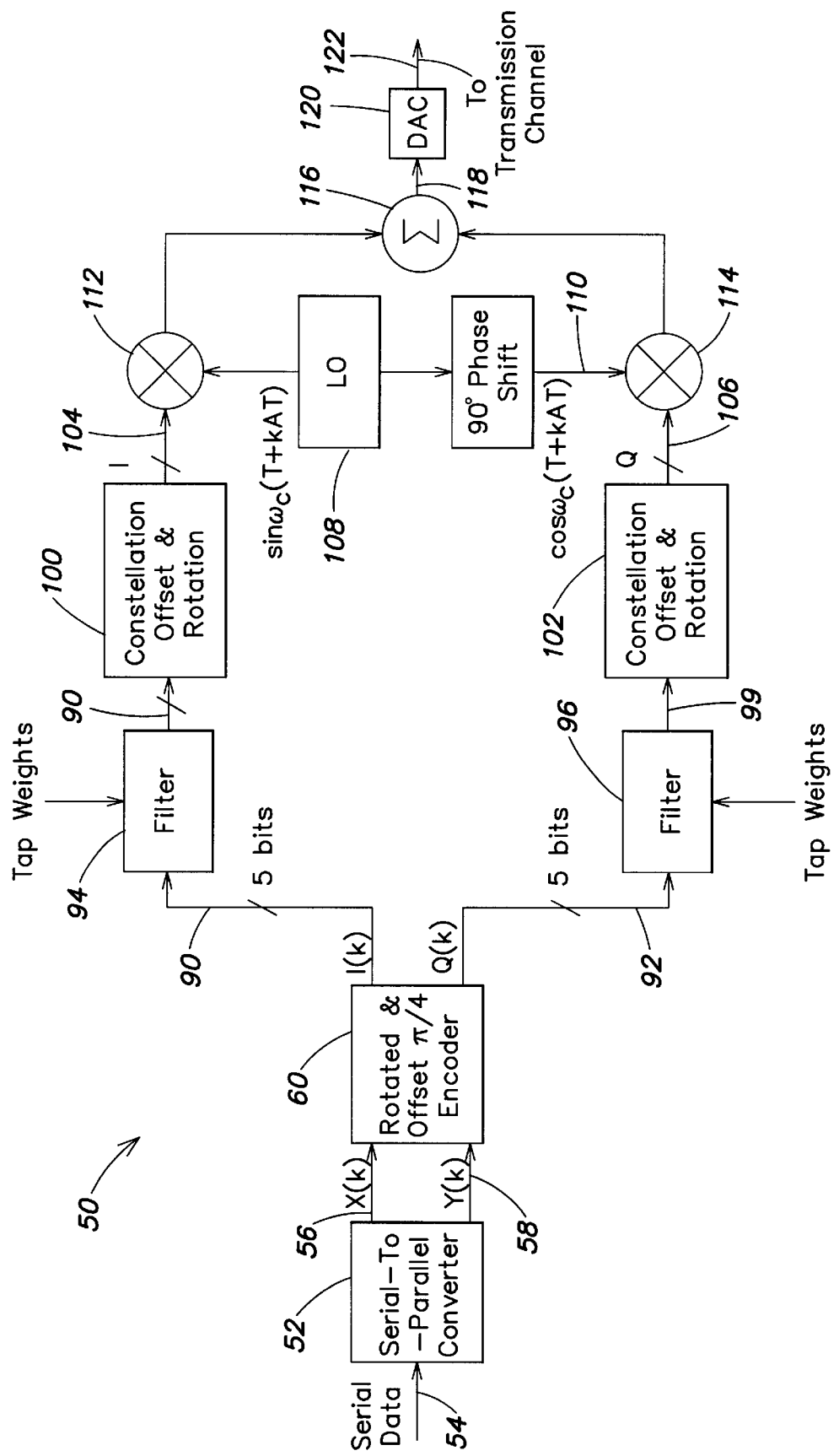
FIG. 3 is a functional block diagram of a π/4 DQPSK modulator comprising a π/4 DQPSK encoder according to the present invention.

Referring to FIG. 3, a π/4 DQPSK modulator 50 includes a serial-to-parallel converter 52 which receives a serial data stream on a line 54 and provides two bit streams X(k), Y(k) on lines 56, 58 respectively in a known manner. The signals X(k), Y(k) on the lines 56, 58 define a phase state change value (φ) as follows:

TABLE 1

| X(k) | Y(k) | PHASE STATE CHANGE VALUE (φ) |
|---|---|---|
| 0 | 0 | π/4 |
| 0 | 1 | 3π/4 |
| 1 | 0 | 7π/4 |
| 1 | 1 | 5π/4 |

The encoder 60 then computes inphase I(k) and quadrature Q(k) signal values at discrete time k. I(k−1) and Q(k−1) are the previous values (i.e., at discrete time k−1) for the inphase and quadrature components, respectively. According to the present invention, the encoder 60 employs a rotated and offset signalling constellation to compute I(k), Q(k) based upon I(k−1), Q(k−1) and the phase state change value (φ) defined by X(k) and Y(k). We shall now discuss the significance of the rotated and offset signalling constellation.

Figure 1:
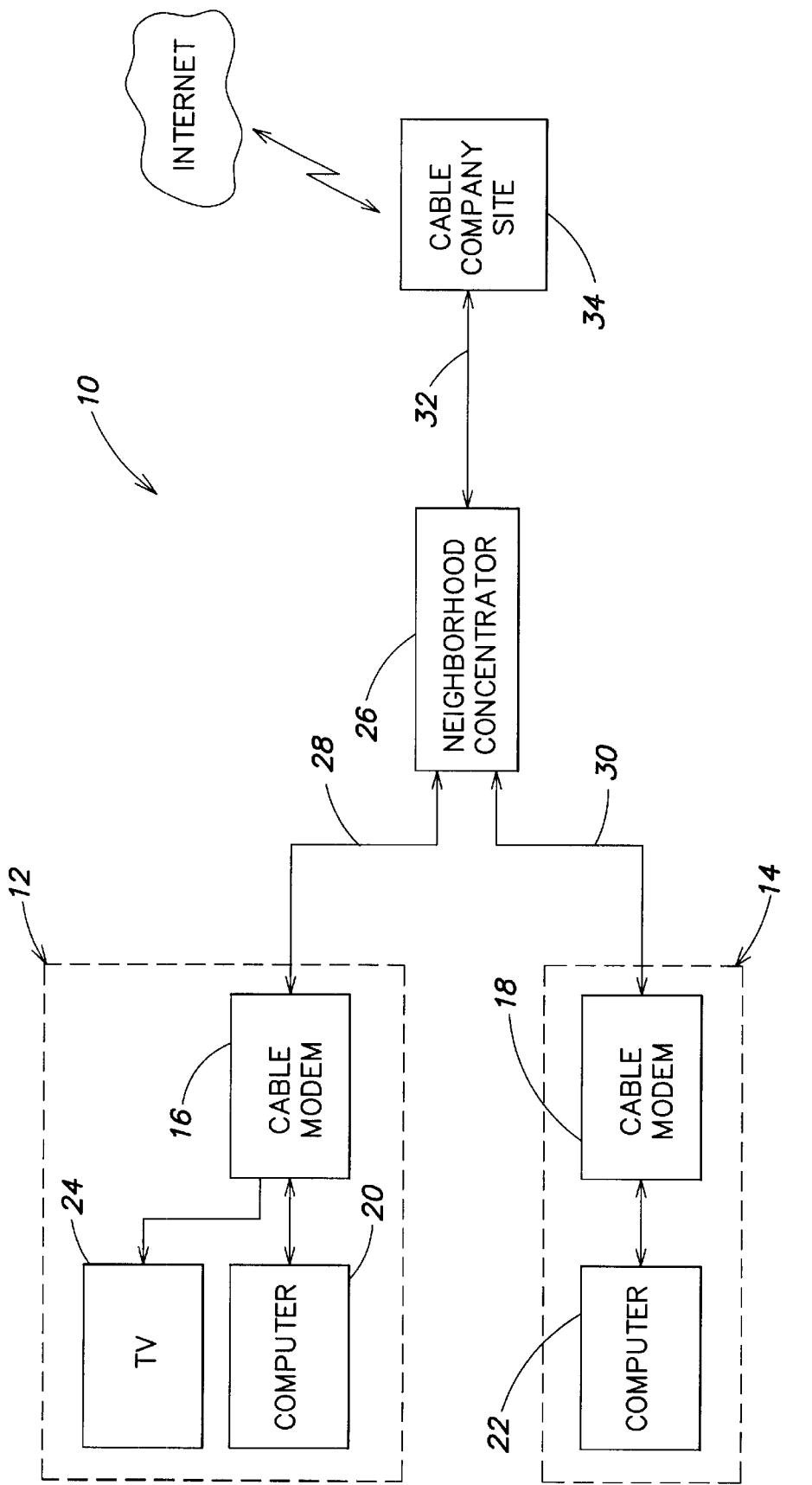
FIG. 1 illustrates a functional block diagram of a communications system.
Figure 2:
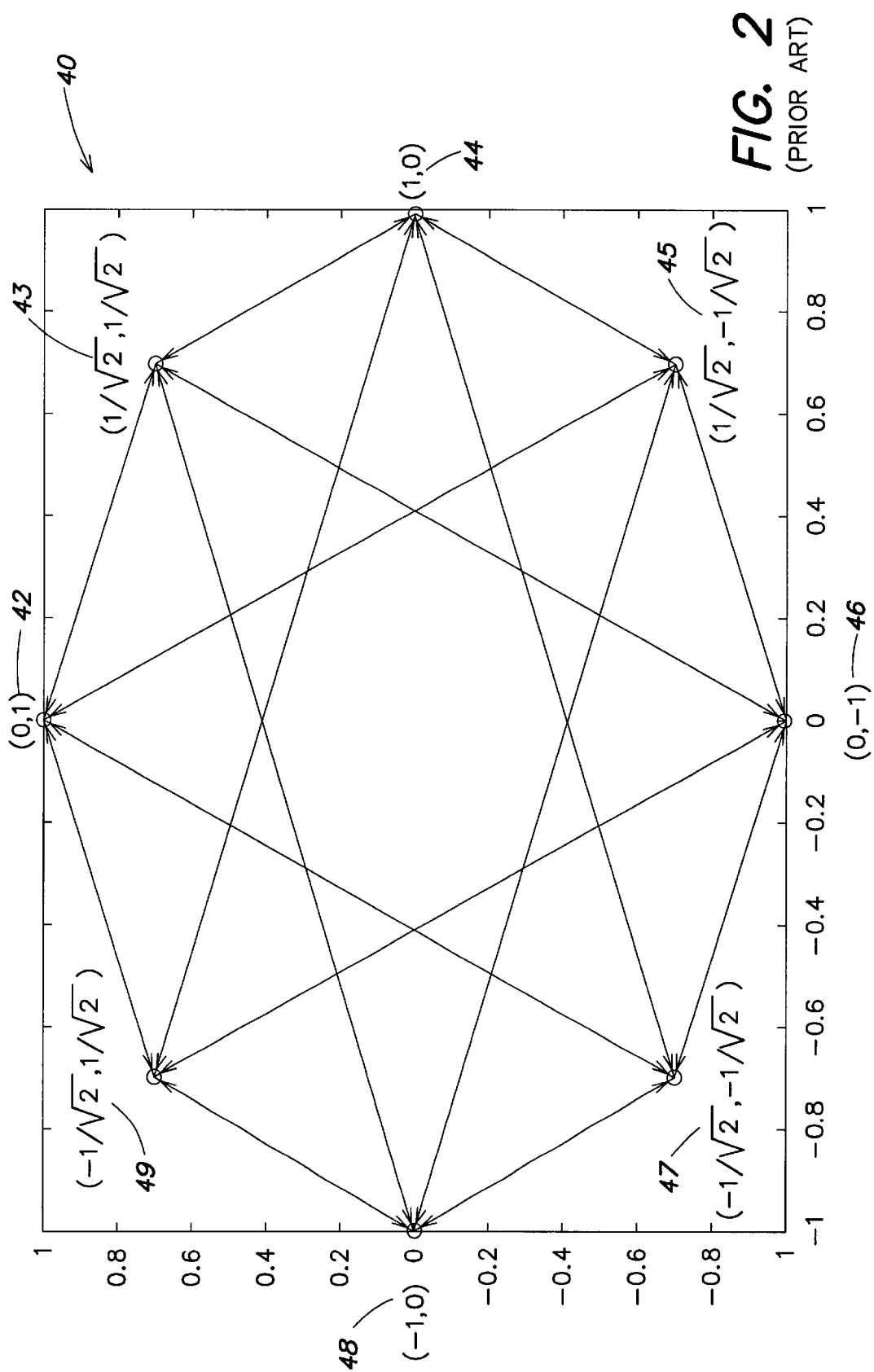
FIG. 2 illustrates a plot of a signalling constellation for a conventional π/4 DQPSK encoder.
Figure 4:
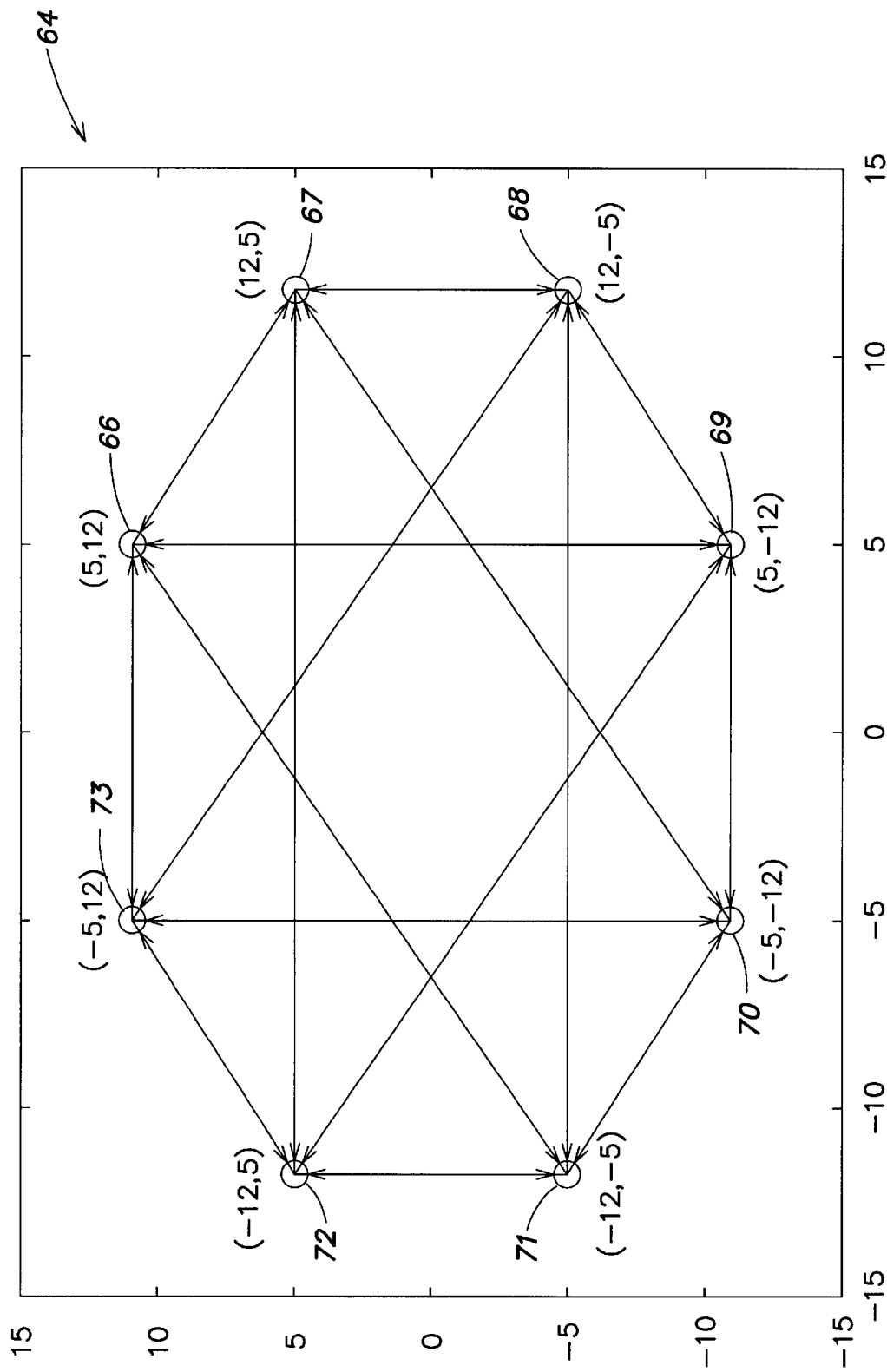
FIG. 4 illustrates a plot of a signalling constellation for a rotated π/4 DQPSK encoder.

FIG. 4 illustrates a plot of a rotated π/4 DQPSK signaling constellation 64 comprising eight points 66–73. Attention is drawn to the fact that each of the eight points 66–73 has been rotated twenty-two (22.5) degrees in contrast to the prior art signaling constellation 40 illustrated in FIG. 2. Notably, rotating the constellation by twenty-two (22.5) degrees allows the new coordinate locations to be represented with integers ±5 and ±12 exclusively (simulations indicate that this rotation introduces only a small rotation angle error). That is, the eight coordinate locations for the rotated constellation are defined as follows:

TABLE 2

| I | Q |
|---|---|
| 5 | 12 |
| 12 | 5 |
| 12 | −5 |
| 5 | −12 |
| −5 | −12 |
| −12 | −5 |
| −12 | 5 |
| −5 | 12 |

Each of these rotated constellation locations can be offset so each location is defined by a positive integer. In a preferred embodiment, the rotated constellation 64 is offset by adding twelve (12) to each I and Q component so only positive integers need to be represented.

Figure 5:
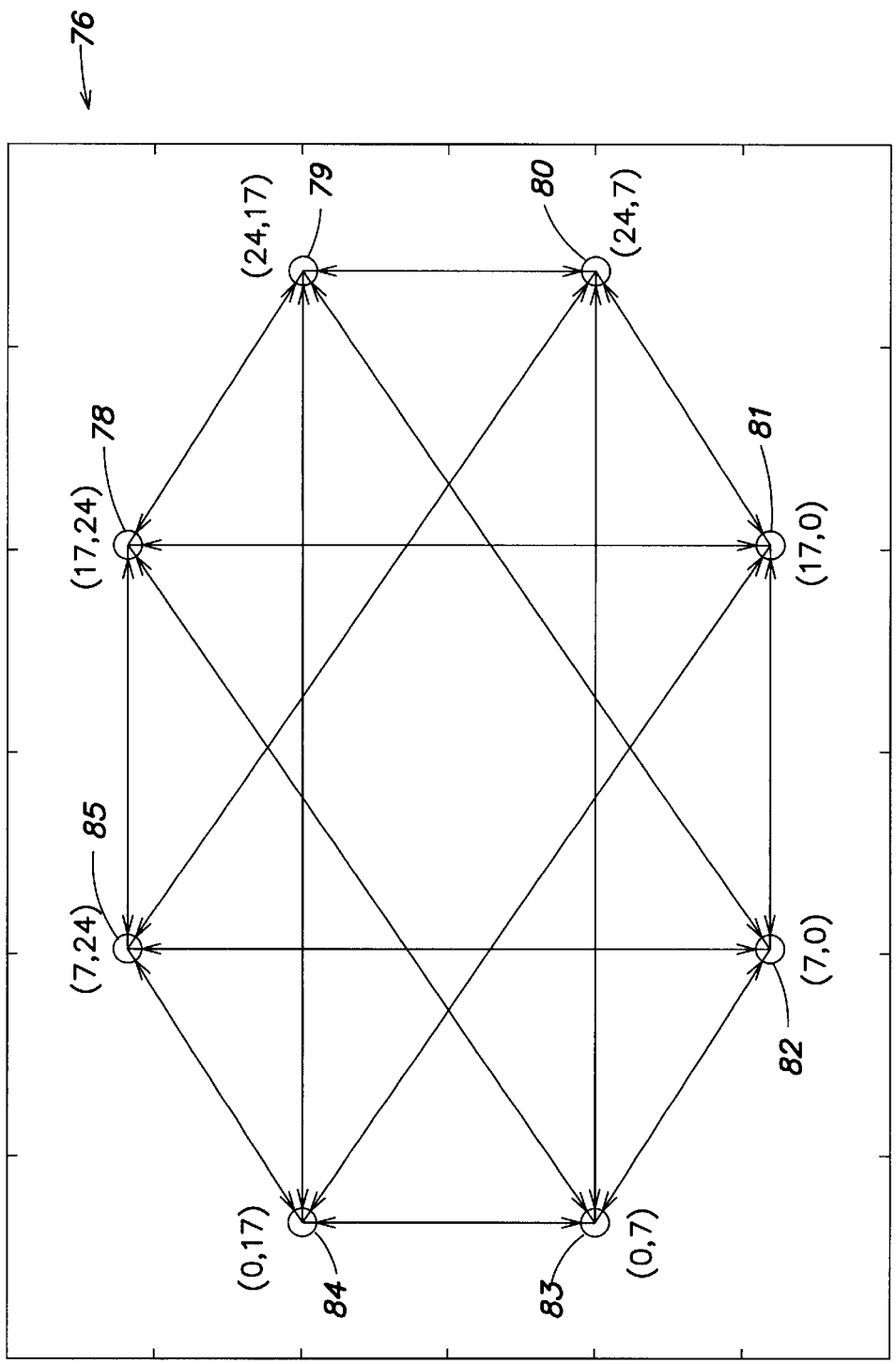
FIG. 5 illustrates a plot of a signalling constellation for a rotated and offset π/4 DQPSK encoder.

FIG. 5 illustrates a plot of a rotated and offset constellation 76 comprising eight points 78–85. The rotated and offset constellation 76 is substantially the same as the rotated constellation 64 (FIG. 4), except that each of the points in the rotated and offset constellation 76 has been shifted by twelve along both the I and Q axes. As a result, the eight points 78–85 in the rotated and offset constellation 76 are defined as:

TABLE 3

| I | Q |
|---|---|
| 17 | 24 |
| 24 | 17 |
| 24 | 7 |
| 17 | 0 |

TABLE 3-continued

| I | Q |
|---|---|
| 7 | 0 |
| 0 | 7 |
| 0 | 17 |
| 7 | 24 |

As a result of the offset, positive integers 0, 7, 17 and 24 are used to represent the eight constellation points.

Each of the points in the rotated and offset signalling constellation 76 (i.e., 0, 7, 17 and 24) can be expressed in binary as follows:

TABLE 4

| Decimal value | Binary value |
|---|---|
| 0 | 00000 |
| 7 | 00111 |
| 17 | 10001 |
| 24 | 11000 |

The binary values representative of seventeen and twenty-four include only two bits that are set (i.e., a "1"). In contrast, the value seven requires three bits to be set. However, seven can also be represented as (8-1) which is expressed as 01001 binary. Therefore, representing seven as 01001 binary allows each the non-zero values (i.e., 7, 17 and 24) in the rotated and offset constellation 76 to be represented by a five-bit binary value which has only two bits set.

Referring again to FIG. 3, since the rotated and offset constellation 76 points are each represented by five bits, the encoder 60 provides a five-bit wide data signal on a line 90 indicative of I(k) and a five-bit wide data signal on a line 92 indicative of Q(k). To compute I(k) and Q(k), the encoder 60 reads the phase state change signals X(k), Y(k) on the lines 56, 58 and determines the phase state change value (φ) using Table 1 set forth above. The encoder 60 then computes the new values I(k) and Q(k) based upon a mapping function illustrated in FIG. 6. For example, referring to FIGS. 5 and 6, if I(k−1), Q(k−1) are located at coordinate location (17,24) 78 and the phase state change value is π/4 (i.e., X(k)=0, Y(k)=0) then I(k), Q(k) will be located at coordinate location (7,24) 85. In a preferred embodiment, the transitions from each value of I(k−1) and Q(k−1) are hardwired or stored in memory, rather than computing I(k) and Q(k) for each sample using difference equations. One of ordinary w skill will recognize that the encoder 60 does not explicitly calculate the phase state change value (φ), since the mapping to determine X(k), Y(k) can be performed using I(k−1), Q(k−1), X(k) and Y(k).

The encoded signals on line 90, 92 are input to digital pulse shaping filters 94, 96 respectively. Pulse shaping is generally required due to the finite bandwidth of the transmission channel (e.g., coax cable, wireless, etc) and the tendency for unshaped pulses to spread in time such that they overlap adjacent pulses or symbols causing intersymbol interference (ISI). Each of the digital filters 94, 96 includes a plurality of taps (e.g., forty-one) that are preferably dynamically programmable, and each of the taps is preferably at least about eight bits in length. Therefore, since the encoder 60 employs the rotated and offset signalling constellation 76 (FIG. 5) which facilitates reducing the bit length of the signals on the lines 90, 92 to five bits, the length of each filter tap is also reduced along with the bit length of the signals on the lines 98, 99. In contrast, prior art systems such as the programmable digital QPSK/16-QAM modulator integrated circuit, part number AD9853, manufactured and sold by the assignee of the present invention, use ten-bit filter tap lengths.

As set forth above, each of the non-zero coordinates of the rotated and offset signalling constellation can be represented by five bits (see Table 4), and each of the non-zero values includes only two bits that are set. Therefore, multiplications and additions performed by the digital filters 94, 96 can be performed by simply shifting bits and adding. Advantageously, this significantly reduces the complexity of the hardware required to implement the digital filter. Multiplierless digital filters are discussed in the publication entitled *"The Design of Multiplierless Digital Data Transmission Filters With Powers-of-Two Coefficients"* by Henry Samueli, IEEE International Telecommunications Symposium, 1990. This paper is hereby incorporated by reference.

The digital filters 94, 96 provide filtered I and Q signal values on lines 98, 99 to constellation offset and rotation circuitry 100, 102 respectively. The circuitry 100, 102 offsets and rotates the filtered I and Q signal value to undo the offset and 22.5 degree rotation employed by the encoder 60. The offset and rotation can be performed using the following equations:

$$I'=(I_0-12)\cos(\theta)-(Q_0-12)\sin(\theta) \quad \text{(Eq. 1a)}$$

$$Q'=(I_0-12)\cos(\theta)+(Q_0-12)\sin(\theta) \quad \text{(Eq. 1b)}$$

where:

θ is the angle of rotation (i.e., 22.5 degrees);

$I_0, Q_0$ are the points to be rotated; and

I', Q' define the rotated points.

In a preferred embodiment, the rotation is performed using the known Booth algorithm. As a result, the constellation rotation and offset circuits 100, 102 provide offset and rotated values I, Q on lines 104, 106 respectively.

The offset and rotated signal value I on the line 104 is then multiplied by a sine wave generated by a local oscillator (LO) 108, while the rotated and offset signal value Q on the line 106 is multiplied by a cosine wave on a line 110. The products provided by multipliers 112, 114 are input to a summer 116 which provides a summed value on a line 118 to a digital-to-analog converter (DAC) 120 which provides a modulated transmit signal on a line 122.

Although the present invention has been shown and described with respect to several preferred embodiments thereof, various changes, omissions and additions to the form and detail thereof, may be made therein, without departing from the spirit and scope of the invention.

What is claimed is:

1. A π/4 differential quadrature phase shift keying (DQPSK) encoder for use in a π/4 DQPSK modulator, said encoder comprising:

means for receiving phase state change data; and means for computing I(k) and Q(k) signal values based upon said phase state change data and previous values of said I(k) and Q(k) signals, using a rotated and offset signaling constellation, wherein said I(k) and Q(k) signal values are provided as positive integers.

2. The encoder of claim 1, wherein said phase state change data comprises a first signal X(k) and a second signal Y(k) which are indicative of a phase state change value (φ).

3. The encoder of claim 1, wherein said positive integers are 0, 7, 17 and 24.

4. The encoder of claim 1, wherein said means for computing determines said I(k) and Q(k) signal values based upon the current value of said X(k), Y(k), and past values I(k−1) and Q(k−1) using the following relationship.

| I(k − 1) | Q(k − 1) | X(k) | Y(k) | I(k) | Q(K) |
|---|---|---|---|---|---|
| 17 | 24 | 0 | 0 | 7 | 24 |
| 17 | 24 | 0 | 1 | 0 | 7 |
| 17 | 24 | 1 | 0 | 24 | 17 |
| 17 | 24 | 1 | 1 | 17 | 0 |
| 24 | 17 | 0 | 0 | 17 | 24 |
| 24 | 17 | 0 | 1 | 0 | 17 |
| 24 | 17 | 1 | 0 | 24 | 17 |
| 24 | 17 | 1 | 1 | 7 | 0 |
| 24 | 7 | 0 | 0 | 24 | 17 |
| 24 | 7 | 0 | 1 | 7 | 24 |
| 24 | 7 | 1 | 0 | 17 | 0 |
| 24 | 7 | 1 | 1 | 7 | 24 |
| 17 | 0 | 0 | 0 | 24 | 7 |
| 17 | 0 | 0 | 1 | 17 | 24 |
| 17 | 0 | 1 | 0 | 7 | 0 |
| 17 | 0 | 1 | 1 | 0 | 17 |
| 7 | 0 | 0 | 0 | 17 | 0 |
| 7 | 0 | 0 | 1 | 24 | 17 |
| 7 | 0 | 1 | 0 | 0 | 7 |
| 7 | 0 | 1 | 1 | 7 | 24 |
| 0 | 7 | 0 | 0 | 7 | 0 |
| 0 | 7 | 0 | 1 | 24 | 7 |
| 0 | 7 | 1 | 0 | 0 | 17 |
| 0 | 7 | 1 | 1 | 17 | 24 |
| 0 | 17 | 0 | 0 | 0 | 7 |
| 0 | 17 | 0 | 1 | 17 | 0 |
| 0 | 17 | 1 | 0 | 7 | 24 |
| 0 | 17 | 1 | 1 | 24 | 17 |
| 7 | 24 | 0 | 0 | 0 | 17 |
| 7 | 24 | 0 | 1 | 7 | 0 |
| 7 | 24 | 1 | 0 | 17 | 24 |
| 7 | 24 | 1 | 1 | 24 | 7 |

5. The encoder of claim 3, wherein said positive integers are each represented by five bits, and integers 7, 17 and 24 are presented with two bits set.

6. The encoder of claim 3, wherein said means for computing comprises a memory device which maps values of said previous values of said I(k), Q(k), and X(k) and Y(k) to determine said I(k) and Q(k).

7. The encoder of claim 3, wherein said means for computing is hardwired within an integrated circuit.

8. A π/4 differential quadrature phase shift keying (DQPSK) modulator, comprising:

a serial-to-parallel converter which receives a serial data stream and provides parallel data stream signal values X(k), Y(k) indicative of a phase state change value;

an encoder that receives said signal values X(k), Y(k) and computes I(k) and Q(k) signal values using said X(k) and Y(c) values and previous values of said I(k) and Q(k) signals, wherein said I(k) and Q(k) signal values are represented as positive integers;

means for filtering said I(k) and Q(k) singal values and providing filtered I(k) and Q(k) signal values;

means for rotating and offsetting said filtered I(k) and Q(k) signal values and providing rotated and offset I(k) and Q(k) signal values; and means for modulating said rotated and offset I(k) and Q(k) signal values to provide a modulated transmit signal.

9. The modulator of claim 8, wherein said encode represents said I(k) and Q(k) signal values using integers 0, 7, 17 and 24.

10. The modulator of claim 8, wherein said means for filtering includes a programmable digital filter.

11. The modulator of claim 10, wherein said digital programmable filter comprises multiplierless filter.

12. The modulator of claim 11, wherein said I(k) and Q(k) signal values an each represented by five bits, and integers 7, 17 and 24 are presented with two bits set.

13. The modulator of claim 8, wherein said rotated and offset I(k) and Q(k) signals values include non-integer values.

14. A method of encoding in a π/4 differential quadrature phase shift keying (DQPSK) encoder, comprising:

receiving phase state change data; and computing I(k) and Q(k) signal values based upon said phase state change data and previous values of said I(k) and Q(k) signals input to a rotated and offset constellation thereby generating an encoded signal, wherein said I(k) and Q(k) signal values are provided as positive integers.

* * * * *

UNITED STATES PATENT AND TRADEMARK OFFICE
CERTIFICATE OF CORRECTION

PATENT NO. : 6,396,880 B1
DATED : May 28, 2002
INVENTOR(S) : Stroud

It is certified that error appears in the above-identified patent and that said Letters Patent is hereby corrected as shown below:

<u>Title page,</u>
Item [73], add to read as follows:

-- [73]  Assignee: Analog Devices, Inc., Norwood, Mass. --

Signed and Sealed this

Fourth Day of February, 2003

JAMES E. ROGAN
*Director of the United States Patent and Trademark Office*